Feb. 12, 1935.    C. J. WERNER    1,991,040
SYSTEM OF MOTOR CONTROL
Filed March 22, 1933    2 Sheets-Sheet 1

INVENTOR
Calvin J. Werner
BY
his ATTORNEYS

Feb. 12, 1935.   C. J. WERNER   1,991,040
SYSTEM OF MOTOR CONTROL
Filed March 22, 1933   2 Sheets-Sheet 2

INVENTOR
Calvin J. Werner
BY
his ATTORNEYS

Patented Feb. 12, 1935

1,991,040

UNITED STATES PATENT OFFICE 1,991,040

SYSTEM OF MOTOR CONTROL

Calvin J. Werner, Dayton, Ohio, assignor, by mesne assignments, to General Motors Corporation, Detroit, Mich., a corporation of Delaware Application March 22, 1933, Serial No. 662,029

6 Claims. (Cl. 172—279)

This invention relates to alternating current motors and more particularly to a system of starting and controlling single phase alternating current motors.

An object of this invention is to provide a reliable and durable control system for single phase alternating current motors.

Another object of this invention is to provide an electrically operated control system for controlling the starting and running circuits of single phase alternating current motors.

Another object of this invention is to provide a control system for single phase alternating current motors that will compensate, within a reasonable range, for variations in line voltage.

Another object of this invention is to provide an electrically controlled system for controlling the condenser circuit of a condenser start type of a single phase motor.

Further objects and advantages of the present invention will be apparent from the following description, reference being had to the accompanying drawings wherein a preferred embodiment of one form of the present invention is clearly shown.

Figure 1:
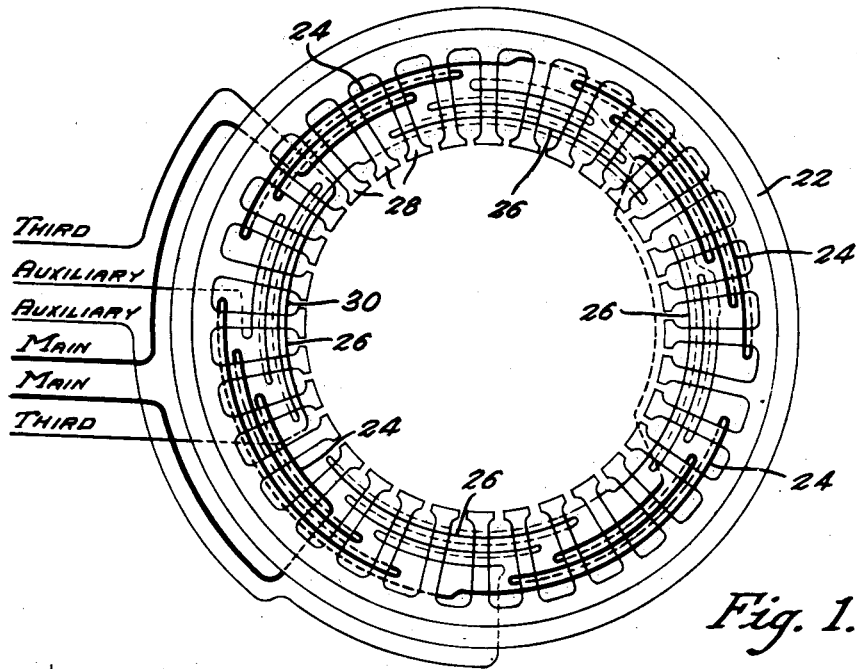
Fig. 1 is a wiring diagram of the stator of a motor adapted to be used in the present invention.
Figure 2:
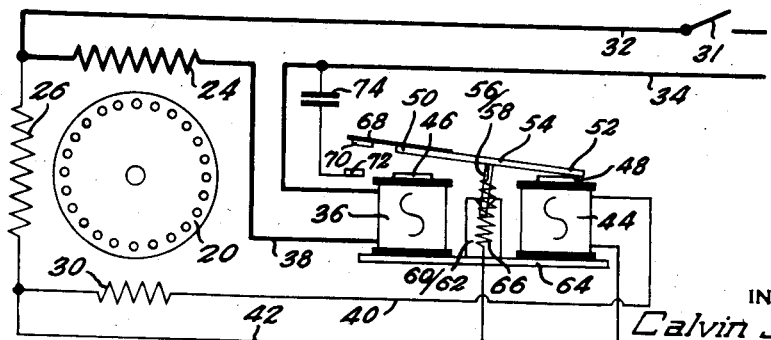
Fig. 2 is a wiring diagram illustrating the circuit connections of a system embodying the present invention.

With particular reference to Figs. 1 and 2, the electric motor comprises a squirrel cage rotor 20 in cooperative relation with a stator 22 having teeth such as 28 upon which a main field winding 24 and an auxiliary field winding 26 are arranged as shown in Fig. 1. Stator teeth surrounded by a section or part of the auxiliary winding 26 are also surrounded by a third winding 30 which is effectively magnetically coupled with the rotor and preferably with only the auxiliary winding 26, since the coupling between the winding 30 and the ends of the main field winding 24 is substantially neutralized by virtue of the substantially equal coupling with both ends of the winding. The reduced effective magnetic coupling between the main winding and the third winding is preferable, since it is desirable to obtain a large percentage change in the controlling voltage. Furthermore, the circuit to the auxiliary field winding circuit is opened after the motor is started, so that a reduction of rotor speed due to an overload or reduction of line voltage permits the switch to be more easily actuated to the start position.

A power supply line wire 32 is connected to the main field winding 24 and to the auxiliary field winding 26. Another power supply line wire 34 is connected to an electromagnet 36 which, in turn, is connected by a wire 38 to the main field winding 24. The third winding 30 is connected by wires 40 and 42 to an electromagnet 44, and is also connected to the auxiliary field winding 26. The electromagnets 36 and 44 are provided with cores 46 and 48 respectively, which cooperate respectively with lever arms 50 and 52 of a common armature 54, which armature is provided with bifurcated arms 56 and 58 which straddle respectively bifurcated arms 60 and 62 of the base 64, as shown in the diagram. The armature 54 is maintained yieldingly either in a position inclined toward the core 48, or inclined toward the core 46, by a spring 66 connecting the armature 54 with the base 64, and so arranged that its center line of action moves to either side of a vertical plane through the center lines of the arms 56, 58, 60 and 62. The armature 54 has a contact carrying member 68 mounted thereon and carrying the contact 70, which contact is engageable with a cooperating contact 72. A condenser or a reactance 74 is connected to the power supply line wire 34 and to the contact 72. The contact 70 is connected through the contact carrying member 68, armature 54, spring 66 and bifurcated arms 56, 58, 60 and 62 to the wire 42 and the common connection between the auxiliary field winding 26 and third winding 30. Hence, when the contacts 70 and 72 are engaged a circuit is completed from the power supply line wire 34 through the condenser or reactance 74 and those contacts to the auxiliary field winding 26 to establish a starting circuit. When the contacts 70 and 72 are disengaged, the circuit to the auxiliary field winding is opened, and the running circuit established.

When the power supply circuit is closed through a switch 31, the electromagnet 36 is energized by virtue of its connection to both sides of the power supply line through the main field winding 24. At the instant prior to starting, only a small current is induced in the electromagnet 44, since at that instant the rotor is stationary, and since without rotation of the rotor there will be no rotational voltage induced in the third winding 30, although there is a small transformer voltage induced after the circuit to the auxiliary winding 26 is closed. Therefore, regardless of the voltage impressed upon the main field winding 24, within reasonable limits, the electromagnet 36 will attract the armature 54 and thereby bring about engagement of the cooperating contacts 70 and 72. Engagement of these contacts is facilitated and aided by the spring 66 when it crosses the center line of the bifurcated arms to the side toward which the armature is moved, and tends to close the contacts with a snap action. Engagement of the contacts 70 and 72 closes the circuit between the power supply line wire 34 and the auxiliary field winding 26 through the condenser or reactance 74.

Since the circuit between the power supply line wire 34 and the auxiliary field winding 26 is formed through a capacitive reactance, and the circuit to the main field winding 24 from a power supply line wire 34 is substantially direct, a phase difference is produced between the main and auxiliary field windings; that is, the current in the auxiliary field winding 26 leads that in the main field winding 24. After engagement of the contacts 70 and 72, the pull of the electromagnet 36 upon the arm 50 of the armature 54, together with the urging force of the spring 66 tends to maintain engagement of the contacts. The circuit thus formed in the main field winding 24 and the auxiliary field winding 26 together with the position of those windings, causes the rotating field to be produced that starts the rotation of the rotor 20.

Figures 3, 4:
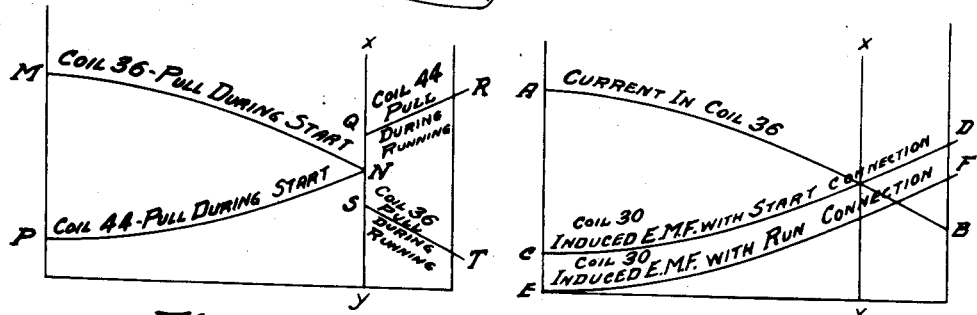
Fig. 3 illustrates by curves the variations in pull of the electromagnetic switch corresponding to variations in the speed of the rotor.
Fig. 4 illustrates by curves the variations in the induced electromotive forces and current in the electromagnets of the electromagnetic switch corresponding to variations in the speed of the rotor.

A rotational voltage is induced in the third winding 30 by virtue of its magnetic relation with the rotor field, and the rotation of the rotor. Referring to Fig. 4, it will be noted that as the rotor speed increases, the current of the electromagnet 36 decreases, while the induced electromotive force in the third winding 30 increases, as represented by the curves A—B and C—D respectively. Consequently, the pull effected by the electromagnet 36 upon the armature 54 decreases as represented by the curve M—N in Fig. 3; while the pull effected by the electromagnet 44 increases due to the increased voltage induced in the winding 30 due to the increase in rotor speed, and as represented by the curve P—N at a certain critical speed, such as that represented by the lines x—y in Figs. 3 and 4, the force exerted upon the arms 50 and 52 of the armature 54 is substantially equal, and an increase in speed above that value will result in the armature 54 being moved into a position such as that indicated in Fig. 2, with the armature 54 attracted by the electromagnet 44. Thus, the contacts 70 and 72 will be thereby disengaged, and the circuit from the line wire 34 to the auxiliary field winding 26 opened. The rotor, at the time of the opening of the contacts 70 and 72, shall have reached a sufficient speed to produce its own rotating field by virtue of the transformer and rotational voltages induced therein, and the running circuit thereby established.

Referring again to Figs. 3 and 4, it will be noted that when the switch is thus in the run position, and the rotor is rotating at a speed above that indicated by the line x—y the voltage induced in the third winding 30 which effects the energization of the electromagnet 44 is less than when the switch is in the start position, and the rotor speed is below that indicated by the line x—y, as represented by the curve E—F. This is due to the opening of the circuit to the auxiliary field winding 26, with which the third winding 30 is magnetically coupled. However, the electromagnet 44 exerts a greater force upon the arm 52 of the armature 54 than the electromagnet 36 does upon the arm 50, as represented by the curves Q—R and S—T. This is due to the characteristic variations in the force of the magnet with the distance from the magnet.

Figure 5:
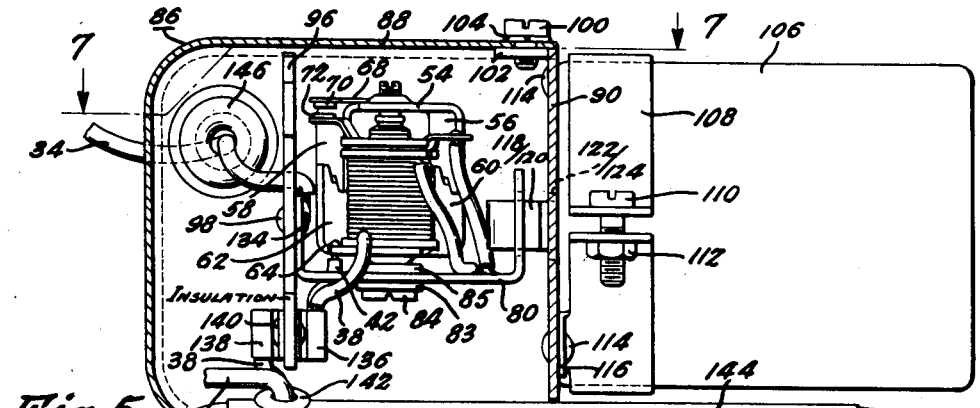
Fig. 5 is a fragmentary elevation of an assembly embodying the present invention, and some of the parts thereof are shown in section.
Figure 6:
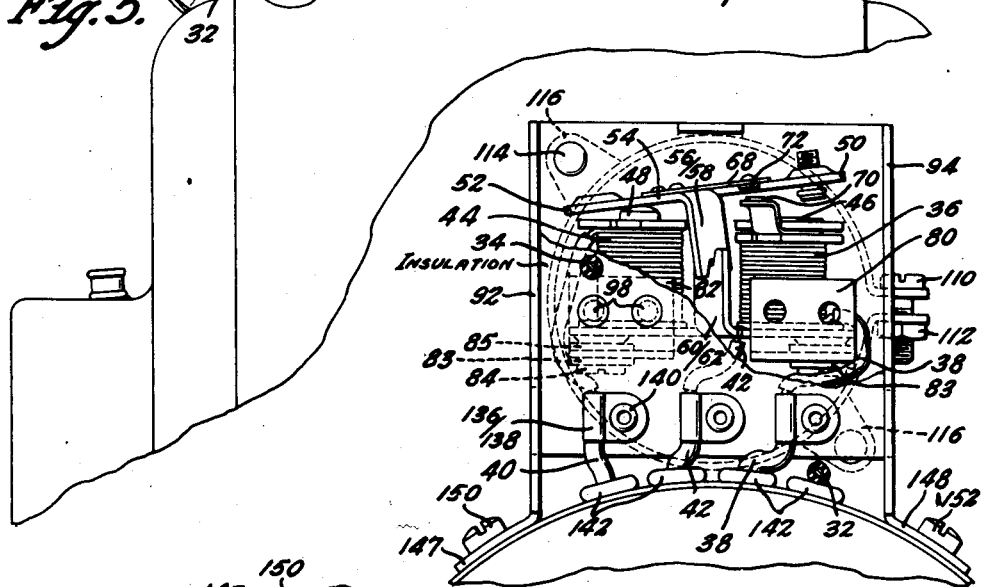
Fig. 6 is a fragmentary view with part cut away to show a side elevation of the electromagnetic switch.
Figure 7:
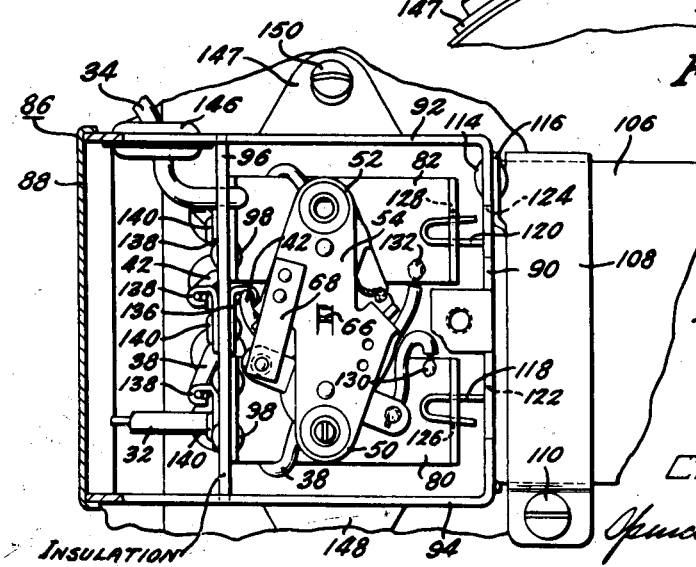
Fig. 7 is a fragmentary view showing the top of the electromagnetic switch.

With reference to Figs. 5, 6 and 7, the electromagnet switch shown, and illustrated diagrammatically in Fig. 2, is the subject matter of a copending application, Serial No. 642,158, filed November 11, 1932, and is explained there in detail. Since the principal elements of the structure and the operation of this switch have previously been described herein, and similar reference numerals apply to similar parts in Figs. 5, 6 and 7, no further explanation of the details of this switch will be given with reference to the latter figures. The base 64 of the switch is secured to brackets 80 and 82 by screws 84 or other suitable fastening means and is insulated therefrom by insulating washers such as 83 and 85. A housing 86 having a removable cover 88 and side walls 90, 92 and 94 preferably formed of sheet metal, has a support member 96, preferably of insulating material, supported by the side walls 92 and 94, to which support member the brackets 80 and 82 are secured by rivets 98 or other suitable fastening means. The cover 88 is secured to the housing walls by a screw 100 preferably threaded into a deformed portion 102 of the wall 90 and having a lock washer 104, or by other suitable fastening means. A condenser 106 is removably secured to the wall 90 by flexible band 108 that surrounds the condenser, and preferably has a clamping screw 110 with a cooperating nut 112 for tightening the band about the condenser. The band is secured to the wall 90 by rivets 114 extending through that wall and through deformed portions such as 116 on the band 108, or by other suitable fastening means. The condenser 106 has terminals 118 and 120 for making connection thereto, which terminals project through enlarged openings 122 and 124 respectively in the wall 90, and are deformed so as to project into openings 126 and 128 in the brackets 80 and 82 respectively and make electrical connection therewith. The brackets 80 and 82 thus form the common connecting means to which the connections to the condenser may be soldered such as at 130, 132 and 134. The connections between the switch and electromagnets and the motor windings are made through pairs of lugs such as 136 and 138 on either side of the mounting member 96, which lugs are secured to the mounting member 96 and electrically connected by rivets or other suitable means 140. The lugs thus serve as anchors for the leads. The leads to the motor winding pass through suitable insulating grommets 142 in the motor frame 144, and the lead 34 extends through a suitable insulating grommet 146 in the housing 86. The assembly thus formed by the switch, housing and condenser is secured to the motor frame 144 by mounting lugs 147 and 148 preferably formed on the walls 92 and 94 respectively and having screws or other suitable fastening means 150 and 152 extending therethrough and fastening the lugs to the motor frame.

As disclosed in the embodiment of the present invention, the windings, including the main and auxiliary field windings 24 and 26 and the third winding 30, are considered stator windings because wound thereon. By virtue of the placing or position of the third winding, that winding is magnetically associated with the rotor and has greater magnetic coupling with the auxiliary field winding than with the main field winding. In fact, it is effectively magnetically coupled with only the auxiliary field winding. Hence, there is some voltage induced in the third winding when the circuit to the auxiliary winding is closed, and at the instant prior to the starting of the rotor. However, due to the magnetic relation of the rotor and the third winding, the voltage induced in the third winding increases as the rotor speed increases, since the rate at which the third winding cuts the rotor flux increases with the rotor speed. Having the condenser 74 in series with the auxiliary field winding 26 during starting, causes the current through the auxiliary field winding to lead that through the main field winding. Then, since the rotation of the rotor produces a counter electromotive force in the main field winding, which counter electromotive force increases with the speed of the rotor, the current through the main field winding decreases as the rotor speed increases. Since the electromagnets 36 and 44 are connected to the main and third windings respectively, and in fact, electromagnet 36 is connected in series with the main field winding 24 while the electromagnet 44 is connected across the third winding 30, and since the pull of the electromagnets is dependent upon the current therethrough, the pull of the electromagnet 36 decreases as the pull of the electromagnet 44 increases. The electromagnets opposingly coact upon a common armature and the position of that armature is consequently controlled by the current through the main field winding and the potential across the third winding, and thus serves as a means of controlling the starting and running circuits of the motor, when starting the motor, or in the operation of the motor when an overload or some such condition occurs to appreciably change the speed of the motor.

Since the main field winding and the electromagnet 36 are connected in series, and to the power supply line, the pull of the electromagnet 36 is directly effected by variations in line voltage. And since the third winding is magnetically coupled with the auxiliary field winding, as well as with the rotor and since the rotor speed is dependent somewhat upon line voltage, the pull of the electromagnet 44 is dependent upon factors including line voltage and rotor speed. The coaction of the electromagnets together with the dependence of the pull of the electromagnets upon line voltage, affords a means for compensating, within reasonable limits, for fluctuations or variations in the line voltage.

While the form of embodiment of the present invention as herein disclosed, constitutes a preferred form, it is to be understood that other forms might be adopted, all coming within the scope of the claims which follow.

What is claimed is as follows:

1. A control system for a motor having a rotor and a stator, comprising, in combination, a plurality of stator windings including main and auxiliary field windings displaced from each other substantially 90 electrical degrees, and a third winding in space phase with the auxiliary field windings and connected to one of the field windings; a starting circuit including a reactance in the circuit of one of the windings; a running circuit; a switch having electromagnets for controlling the starting and running circuits and opening the circuit between said reactance and the field winding to establish the running circuit, one of said electromagnets being connected in the circuit of one of the stator windings, and the other of said electromagnets being connected to another of said stator windings.

2. A control system for a motor having a rotor and a stator, comprising, in combination, a plurality of stator windings including a plurality of field windings and a third winding, said third winding being magnetically coupled with the rotor and also magnetically coupled with one of the field windings and in space phase therewith; a starting circuit including a reactance connected in series with one of the field windings; a running circuit; a switch having cooperating contacts connected in series with the circuit of the field winding and reactance for controlling the circuit therebetween, which contacts, when open, establish the running circuit; and electromagnets for actuating the switch, one of said electromagnets being connected in the circuit of one of the field windings to effect closing of the contacts to establish the starting circuit, and the other of said electromagnets being connected to the third winding to effect opening of the contacts to establish the running circuit.

3. A control system for a motor having a rotor and a stator, comprising, in combination, a plurality of stator windings including a plurality of field windings and a third winding, said third winding being effectively magnetically coupled with the rotor and with only one of the field windings; a starting circuit including a reactance in series with one of the field windings; a running circuit; a switch having cooperating contacts connected in series with the circuit of the field winding and reactance, which contacts, when open, establish the running circuit; means for effecting closing of the contacts to establish the starting circuit; and means responsive to the potential across the third winding for effecting the opening of the contacts to establish the running circuit 4. A control system for a motor having a rotor and a stator, comprising, in combination, a plurality of stator windings including a plurality of field windings and a third winding; said third winding being magnetically associated with the rotor and having greater magnetic coupling with one of the field windings than with the other; a starting circuit including a reactance in the circuit of one of the field windings; a running circuit; a switch having cooperating contacts connected in series with the circuit of the field winding and reactance, which contacts, when open, establish the running circuit; an electromagnet controlled by the current through one of the field windings for effecting closing of the contacts to establish the starting circuit; and an electromagnet controlled by the potential across the third winding for effecting opening of the contacts to establish the running circuits.

5. A control system for a motor adapted to be connected to a power supply line and having a rotor and a stator, comprising, in combination, a plurality of field windings including main and auxiliary field windings; a third winding magnetically associated with the rotor, said third winding being connected to one of the field windings and in space phase with one pole thereof; a starting circuit including a condenser in series with the auxiliary field winding, said condenser and auxiliary field winding being connected across the power supply line; a running circuit; and means for opening the circuit between the auxiliary field winding and the power supply line to establish the running circuit, said means including an electromagnet connected to the third winding.

6. A line voltage compensating system of motor control for a motor adapted to be connected to a power supply line, and having a rotor and a stator, comprising, in combination, main and auxiliary field windings, and a third winding magnetically associated with the rotor; a starting circuit including a reactance and the auxiliary field winding connected in series across the power supply line; a running circuit; a switch having cooperating contacts for controlling the starting and running circuits, said contacts being connected in the circuit of the auxiliary field winding which contacts, when open, establish the running circuit; an electromagnet connected in series with the main field winding, and therefore affected by line voltage, for effecting closing of the auxiliary field winding circuit; and a second electromagnet connected to the third winding for effecting opening of the auxiliary winding circuit, said second electromagnet being responsive to factors including line voltage and rotor speed.

CALVIN J. WERNER.